(12) United States Patent
Uriel

(10) Patent No.: US 10,365,789 B2
(45) Date of Patent: Jul. 30, 2019

(54) COMMON RUN-TIME DESIGN-TIME ENVIRONMENT

(71) Applicant: VMware, Inc., Palo Alto, CA (US)

(72) Inventor: Ilan Uriel, Herzliya (IL)

(73) Assignee: VMWARE, INC., Palo Alto, CA (US)

( * ) Notice: Subject to any disclaimer, the term of this patent is extended or adjusted under 35 U.S.C. 154(b) by 677 days.

(21) Appl. No.: 14/622,987

(22) Filed: Feb. 16, 2015

(65) Prior Publication Data

US 2016/0241448 A1   Aug. 18, 2016

(51) Int. Cl.
| | |
|---|---|
| *H04L 12/24* | (2006.01) |
| *G06F 3/0482* | (2013.01) |
| *G06F 3/0484* | (2013.01) |
| *H04L 12/26* | (2006.01) |
| *G06F 11/34* | (2006.01) |

(52) U.S. Cl.
CPC ........ *G06F 3/0482* (2013.01); *G06F 3/04842* (2013.01); *G06F 11/34* (2013.01); *H04L 43/045* (2013.01)

(58) Field of Classification Search
CPC ..... H04L 41/22; G06F 3/04842; G06F 3/0482
See application file for complete search history.

(56) References Cited

U.S. PATENT DOCUMENTS

| | | | |
|---|---|---|---|
| 7,930,635 B2 | 4/2011 | Mann et al. | |
| 8,499,237 B2 | 7/2013 | Buchs et al. | |
| 8,595,691 B2 | 11/2013 | Ellen et al. | |
| 2009/0132919 A1* | 5/2009 | Allen, Jr. | ............... G06F 9/4446 715/708 |
| 2011/0197178 A1* | 8/2011 | Johnston | .................. G06F 8/33 717/123 |
| 2012/0166984 A1* | 6/2012 | Brunswig | ............. G06F 3/0481 715/765 |
| 2012/0167041 A1* | 6/2012 | Payzer | ................ G06F 21/6209 717/113 |
| 2014/0047413 A1* | 2/2014 | Sheive | .................. H04L 65/403 717/110 |
| 2015/0339104 A1* | 11/2015 | Frenkiel | .................... G06F 8/20 717/113 |
| 2015/0378575 A1* | 12/2015 | Kaplinger | ............... H04L 43/10 715/760 |

OTHER PUBLICATIONS http://technology.amis.nl/wp-content/uploads/images/Design-Time-at-Run-Time_ODTUGTechnicalJournal_Q2_LJ.pdf; ODTUG Technical Journal Corner; Q2; Design Time at Run Time—Power to the end user; accessed Dec. 18, 2014.
Scott Leberknight; http://www.ibm.com/developerworks/library/j-groovierspring2/j-groovierspring2-pdf.pdf; IBM developerWorks; Groovier Spring, Part 2: Change application behavior at run time, Adding dynamically refreshable beans to Spring applications with Groovy; published Jan. 6, 2009.

* cited by examiner

*Primary Examiner* — Shourjo Dasgupta

(57) ABSTRACT

The present disclosure is related to methods, systems, and machine-readable media for a common run-time design-time environment. That a user has design credentials associated with a website can be confirmed. An indication of an interaction of the user with a display element of the website can be received during run-time. A graphical user interface associated with the display element can be displayed to the user during run-time responsive to the interaction and responsive to the confirmation that the user has design credentials. Input from the user that causes a design-time modification to a relationship between the website and a monitoring service can be received in a common run-time design-time environment.

18 Claims, 3 Drawing Sheets

COMMON RUN-TIME DESIGN-TIME ENVIRONMENT

BACKGROUND

An entity, such as a cloud services provider, can provide monitoring services for a website (or a web page of a website). Commonly referred to as "web analytics," these services may entail the measurement, collection, analysis, and reporting of web data. Web data includes, for example, requests for files, page views, bounce rate, exit rate, and click paths. Monitored web data can be used for purposes such as measuring web traffic, performing market research, assessing the effectiveness of the website, auditing technical performance, identifying bottlenecks, and implementing advertising campaigns, among others.

DETAILED DESCRIPTION

Figure 1:
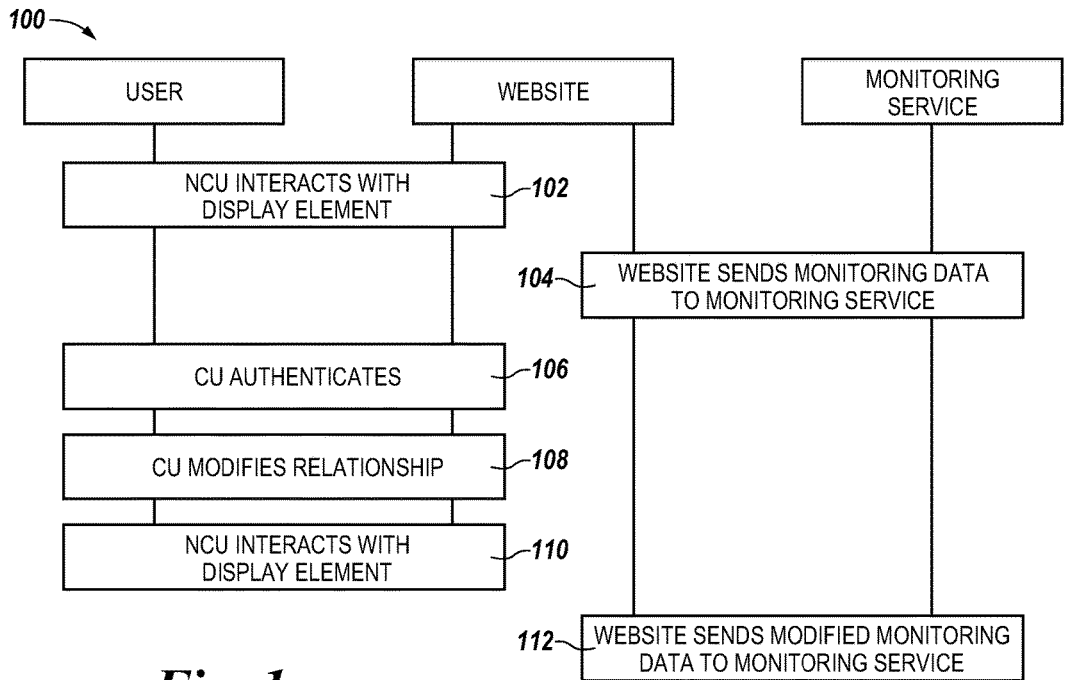
FIG. 1 is a flow chart illustrating an overview of a common run-time design-time environment according to a number of embodiments of the present disclosure.

Monitoring services may provide a range of available services for monitoring a website. A variety of different monitoring service packages may be available, each offering a different set of analytic capabilities. However, at any price, typical services are often generic in that they may not be specifically tailored to individual websites or display elements within websites. Integrating such monitoring services into a website can yield a pre-defined number of monitored metrics.

In many instances, a level of service beyond that which is offered by a given monitoring service package may be desired. For example, web data regarding visitors' interactions with a link to a new promotion on the website in order to gauge the effectiveness of the promotion may be desired. Put another way, an ability to modify the relationship between the website and the monitoring service may be desired. That is, an ability to modify the data provided from the website to the monitoring service to be analyzed and/or reported (herein referred to as "monitoring data") may be desired.

The relationship between the website and the monitoring service can be modified, for instance, in what is commonly referred to as a "design-time environment" (or simply "design-time). In design time, an authenticated user is afforded extra functionality that can be used to make changes to website behavior for run-time users, either noticeable to the run-time users, or not. In design-time, instructions executable to provide the website as well as the instructions executable to provide monitoring data to the monitoring service can be modified (e.g., edited, added, or subtracted). Design-time can be contrasted with a run-time environment (or simply "run-time"), which is what users experience in standard usage of the website, and what occurs when the instructions to provide the website, as well as the instructions to provide monitoring data to the monitoring service, are being executed. In general, run-time is the time during which the program (e.g., the website) is running.

"User" herein refers to anyone using a website in run-time. A user can be a credentialed user (CU) or a non-credentialed user (NCU). A credentialed user can be distinguished from a non-credentialed user in that the credentialed user has been granted rights and/or privileges to modify one or more aspects of a relationship between the website and a monitoring service whereas the non-credentialed user has not. The credentialed user can be provided with (or otherwise have) credentials in accordance with the credentialed user's role (e.g., title, job, responsibilities, etc.) with respect to an entity, such as an organization promulgating the website. In some examples, the credentialed user may be an owner of the website, or a designee of the owner of the website.

Credentialed users can be technical or non-technical. Non-technical credentialed users may not possess the technical expertise to enter design-time and modify the relationship between their website and their monitoring service. That is, non-technical credentialed users, who may be likely to be the end users of web data, may be businesspeople (e.g., marketing or sales personnel, business owners, etc.) rather than web developers, web metrics designers, etc. (i.e., technical credentialed users). Design-time modifications call for a knowledge of programming language that exceeds that of the typical non-technical credentialed user. Under previous approaches, if such a non-technical credentialed user desired to modify the relationship between the website and the monitoring service, the non-technical credentialed user would consult a technical credentialed user, such as a web developer, who has that expertise. A built-in delay exists between when the non-technical credentialed user communicates his desires for the web data to the technical credentialed user and when the non-technical credentialed user ultimately receives that web data. Moreover, technical communication barriers may exist between non-technical credentialed users and technical credentialed users as a non-technical credentialed user may lack the terminology to express specific desired features. Embodiments of the present disclosure can obviate the delays and difficulties inherent in the inclusion of a technical credentialed user to the process.

Embodiments in accordance with the present disclosure can provide a common run-time design time environment. In so doing, an ability is provided for a non-technical credentialed user (e.g., a typical "web surfer," hereinafter referred to simply as "credentialed user") to make design-time modifications, in run-time, to a relationship between a website and a monitoring service. Accordingly, a credentialed user can customize the monitoring of specific elements of a website by a monitoring service without entering design-time and/or writing changes to executable instructions. That is, a credentialed user can extend the monitored metrics by using a designer tool that runs at run-time and unifies a run-time design-time environment.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a flow chart 100 illustrating an overview of a common run-time design-time environment according to a number of embodiments of the present disclosure. As shown in FIG. 1, the flow chart 100 illustrates the high-level interaction between a website and a monitoring system as it pertains to a non-credentialed user, then to a credentialed user, who modifies the relationship, then again to a non-credentialed user. It is noted that where the term "website" is used herein, "website" is intended to refer to one or more web pages of a website unless otherwise indicated.

At block 102, the non-credentialed user interacts with a display element of the website during run-time. Though discussed and further defined below, in this example, the display element is a clickable button on the website. Thus, at block 102, the non-credentialed user clicks on the button. Responsive to that interaction, the website sends monitoring data to the monitoring service at block 104. The steps carried out in blocks 102 and 104 are akin to what happens when a typical internet user interacts with a website that has a relationship with (e.g., sends monitoring data to) a monitoring service.

At block 106, a credentialed user is authenticated to the website during run-time. At block 108, the credentialed user modifies the relationship between the website and the monitoring service while still in run-time. Accordingly, the credentialed user makes a design-time modification to the relationship during run-time, a process defined below. In effect, the credentialed user is able to dictate which monitoring data is to be sent to the monitoring service, how much monitoring data is to be sent to the monitoring service, and what causes that monitoring data to be sent to the monitoring service, all without leaving run-time or needing website design expertise. Subsequently, when a non-credentialed user (who may or may not be the same non-credentialed user referred to above in connection with block 102) clicks the button during run-time at block 110, the website sends the modified monitoring data to the monitoring service at block 112.

Figure 2:
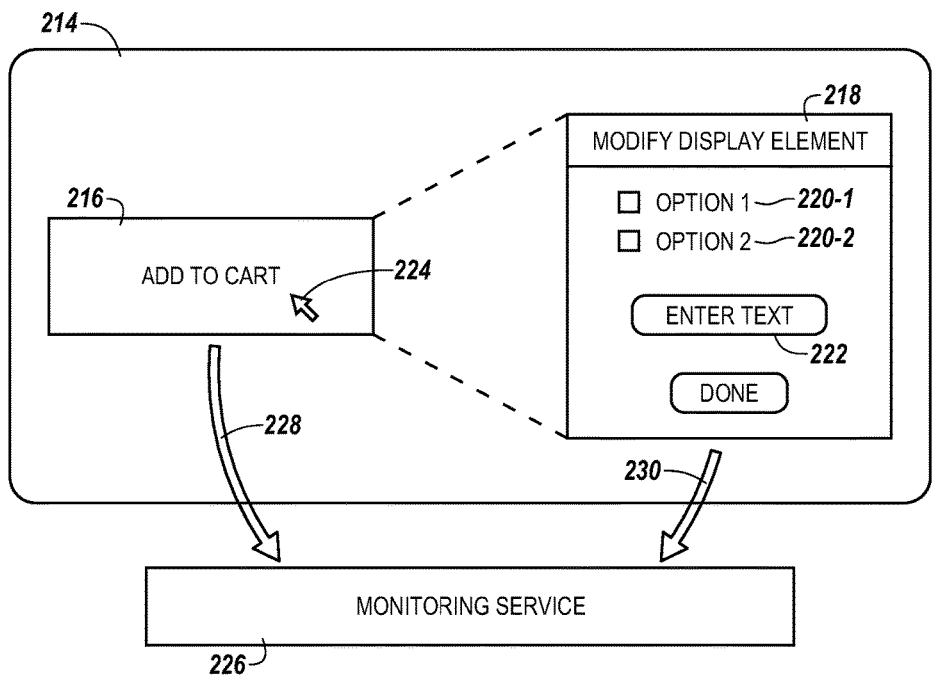
FIG. 2 illustrates a website in a common run-time design-time environment according to a number of embodiments of the present disclosure.

FIG. 2 illustrates a website 214 in a common run-time design-time environment according to a number of embodiments of the present disclosure. The website 214 can send monitoring data 228 to a monitoring service 226 upon non-credentialed-user interaction with a display element 216 in a manner analogous to that discussed above in connection with FIG. 1. In the example illustrated in FIG. 2, monitoring data 228 can be sent to the monitoring service 226 when a non-credentialed user clicks on the display element 216 (in this example an "Add to Cart" button). Embodiments of the present disclosure are not limited to particular types of display elements; for example, a display element can be a selectable element, a hyperlink, an icon, a text entry field, and/or an image, among others.

When an authenticated credentialed user accesses the website 214, the credentialed user can be provided with design-time abilities during run-time. For instance, when the credentialed user interacts with the display element 216 in a manner different than the interaction configured to invoke the run-time functionality of the display element 216 (e.g., hovers over the display element 216 rather than clicks on the display element 216), design-time abilities can be provided to the credentialed user. The different interactions can be referred to as a first interaction: an interaction configured to cause execution of an event in a run-time environment; and a second interaction: an interaction configured to cause execution of design-time functionalities during run-time. An interaction with a display element includes an interaction between an input device (e.g., a mouse, keyboard, etc.) and the display element. Interactions include passive interactions, such as hovering (discussed below), and active interactions, such as clicking and/or entering text, for instance.

Embodiments of the present disclosure do not limit the first and second interactions to particular types of interactions. In some embodiments, the first interaction comprises clicking on the display element 216 using an input device (represented by, and referred to herein, as a "cursor" 224). In some embodiments, the second interaction comprises hovering over the display element via the cursor 224. Hovering, as used herein, refers to maintaining a position of the cursor 224 within a particular area of the website 214 for a particular period of time. It is noted that either the non-credentialed user or the credentialed user can invoke the run-time functionality of the display element 216 by performing the first interaction. That is, a functionality of the display element 216 presented to the credentialed user is a same functionality of the display element presented to the non-credentialed user. The non-credentialed user, however, may be prevented from causing the execution of design-time functionalities by performing the second interaction because the non-credentialed user has not been authenticated as having design credentials.

Responsive to the second interaction, a graphical user interface (GUI) 218 can be displayed. The GUI 218 can be a pop-up window, for instance, which may be adjacent to the display element 216, though embodiments of the present disclosure are not so limited. Through the GUI, the credentialed user can perform a design-time modification to instructions executed to provide monitoring data to the monitoring service 226. Because those instructions govern, among other things, which monitoring data is to be sent to the monitoring service, how much monitoring data is to be sent to the monitoring service, and what causes that monitoring data to be sent to the monitoring service, the credentialed user can modify various aspects of the relationship between the website and the monitoring service using the GUI.

The GUI 218 can receive input from the credentialed user that causes a design-time modification to the relationship between the website 214 and the monitoring service 226. In some embodiments, the GUI 218 includes at least one selectable option. As shown in the example illustrated in FIG. 2, the GUI 218 includes an option 1 220-1 and an option 2 220-2 (sometimes referred to collectively as "options 220"). The options 220 can each cause a respective design-time modification to the relationship between the website 214 and the monitoring service 226. In some embodiments the options 220 may be provided with a text field 222 configured to receive alphanumeric inputs. The alphanumeric inputs may supplement the options 220. For example, the alphanumeric inputs may define variables within the options 220.

One or more of the options 220 can be an option to associate a tag with the display element 216. Associating a tag with the display element 216 includes adding a tag to, or "tagging," the display element 216. A tag, as used herein, refers to an identifier of an action that invokes a functionality by executing executable instructions. In some embodiments, an option can include modifying a tag associated with the display element 216. One or more of the options 220 can be an option to modify a tag associated with an event. Tags can be modified through the use of one or more tag templates, for instance, which may also be selectable via the GUI 218. A tag template may be tailored and/or specific to a particular type of the display element 216. For example, a credentialed user having an item for sale may select a tag template entitled "transaction" from the GUI 218 for its applicability to an ecommerce transaction. Thus, via the template, options presented to the credentialed user for customizing the tag can be conveniently tailored to those pertaining to transaction information. In some embodiments, one or more of the options 220 can be an option to remove a tag associated with the display element 216.

In some embodiments, one or more of the options 220 can be an option to add a definition of an event configured to trigger a tag associated with the display element 216. The triggering, or "firing," of a tag includes the communication of monitoring data to the monitoring service 226 according to the tag. An event, as used herein, refers to at least one condition causing the triggering of a tag. Events include interactions like those discussed above (i.e., clicks and/or hovers), for instance. Events also include affiliate links, article ratings, blog comments, contact forms, file downloads, signups, product ratings, RSS subscriptions, user registrations, video plays, etc. One or more of the options 220 can be an option to modify a definition of an event configured to trigger a tag associated with the display element 216. One or more of the options 220 can be an option to remove a definition of an event configured to trigger a tag associated with the display element 216. The selection of a box in the GUI 218 (e.g., "Done") can store the options 220 that the credentialed user selected. Thereafter, instead of the monitoring data 228, modified monitoring data 230, modified according to the selected options 220, is sent to the monitoring service 226 when a non-credentialed user interacts with the display element 216 (e.g., by the first interaction discussed above).

Accordingly, the selection of one or more of the options 220 causes a design-time change in what monitoring data is being sent to the monitoring service 226. The options 220 can include readily-understandable terminology and plain language. For example, option 1 220-1 can read: "add tag" and option 2 220-2 can read: "change event." Thus, the credentialed user can effect design-time changes without needing developer-level expertise.

Figure 3:
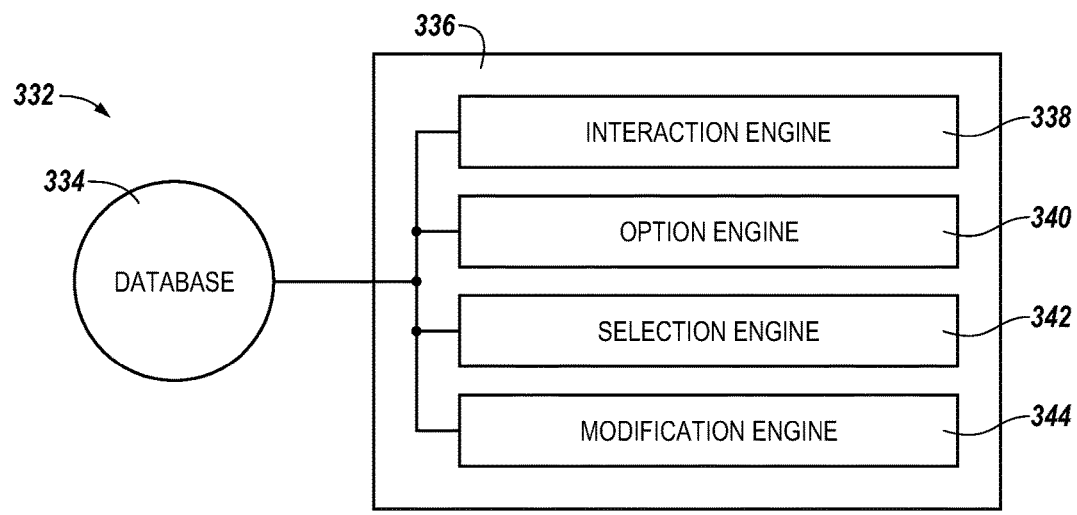
FIG. 3 is a diagram of a system for a common run-time design-time environment according to a number of embodiments of the present disclosure.

FIG. 3 is a diagram of a system 332 for a common run-time design-time environment according to a number of embodiments of the present disclosure. The system 332 can include a database 334, a subsystem 336, and/or a number of engines, for example interaction engine 338, option engine 340, selection engine 342, and/or modification engine 344, and can be in communication with the database 334 via a communication link. The system 332 can include additional or fewer engines than illustrated to perform the various functions described herein. The system can represent program instructions and/or hardware of a machine (e.g., machine 446 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the interaction engine 338 can include a combination of hardware and program instructions that is configured to receive an indication of an interaction of a credentialed user with a display element of a website during run-time. Display elements can include selectable elements, hyperlinks, icons, text entry fields, images, and others known to those skilled in the art. Interacting with a display element can include interacting with the display element using an input device (e.g., a mouse, keyboard, touch-sensitive display, etc.). For example, interacting can include hovering over the display element via an input device and/or actuating (e.g., clicking and/or tapping on) the display element using an input device. In some embodiments, the interaction of the credentialed user with the display element comprises a different interaction than an interaction with the display element configured to cause execution of an event in a run-time environment. That is, if clicking on a button normally executes the functionality provided by the button (e.g., "add to cart"), the interaction can include hovering over the display element. The interaction can be user-configurable; the credentialed user can define what actions (or inactions) constitute an interaction with a display element. For instance, the credentialed user can define a period of time spent hovering over the display element that constitutes an interaction with that element.

In some embodiments, the option engine 340 can include a combination of hardware and program instructions that is configured to display a GUI associated with the display element to the credentialed user during run-time responsive to the interaction, the GUI including a plurality of selectable options, wherein each option, upon being selected, is configured to cause a different design-time modification to instructions executed to provide monitoring data to a monitoring service. In some embodiments, the GUI can be a pop-up window displayed adjacent to the display element. In some embodiments, an option can include associating tagging the display element; an option can include modifying a tag associated with the display element; an option can include removing a tag associated with the display element; an option can include adding an event configured to trigger a tag associated with the display element; an option can include modifying an event configured to trigger a tag associated with the display element; an option can include removing an event configured to trigger a tag associated with the display element.

In some embodiments, the selection engine 342 can include a combination of hardware and program instructions that is configured to receive an indication of a selection of at least one of the plurality of options during run-time. The selection can be made using a cursor, as previously discussed, and can include alphanumeric inputs made into a text field in some embodiments.

The modification engine 344 can include a combination of hardware and program instructions that is configured to perform at least one design-time modification to the instructions responsive to the selection of the at least one of the plurality of options during run-time. As described herein, a design-time modification to the instructions can cause a modification to a relationship between the webpage and the monitoring service. The design-time modification to the relationship between the website and the monitoring service can include a modification of monitoring data (e.g., website usage data) sent to the monitoring service. In some embodiments, the modified monitoring data is specific to the display element.

Advantageously, according to a number of embodiments of the present disclosure, the modification engine 344 can be configured to perform the at least one design-time modification to the instructions without receiving additional executable instructions from the credentialed user. That is, the design-time modification can be caused by the credentialed user's selection of the one or more options without the credentialed user leaving run-time to make modifications (e.g., add additional executable instructions) to the instructions.

Figure 4:
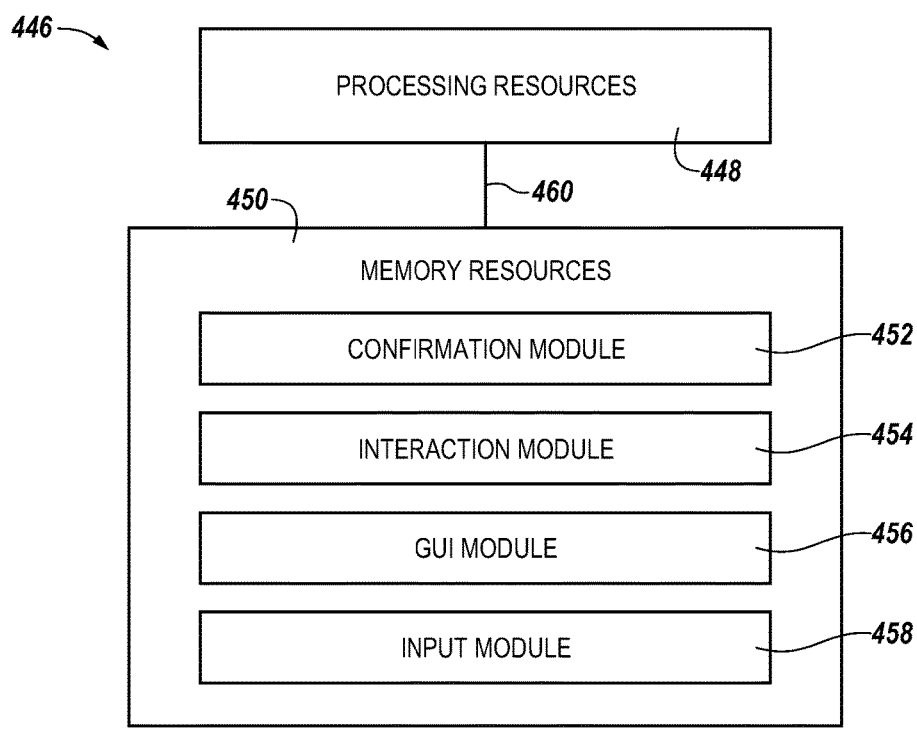
FIG. 4 is a diagram of a machine for a common run-time design-time environment according to a number of embodiments of the present disclosure.

FIG. 4 is a diagram of a machine 446 for a common run-time design-time environment according to a number of embodiments of the present disclosure. The machine 446 can utilize software, hardware, firmware, and/or logic to perform a number of functions. The machine 446 can be a combination of hardware and program instructions configured to perform a number of functions (e.g., actions). The hardware, for example, can include a number of processing resources 448 and a number of memory resources 450, such as a machine-readable medium (MRM) or other memory resources 450. The memory resources 450 can be internal and/or external to the machine 446 (e.g., the machine 446 can include internal memory resources and have access to external memory resources). In some embodiments, the machine 446 can be a virtual computing instance (VCI) or other computing device. The term "VCI" covers a range of computing functionality. The term "virtual machine" (VM) refers generally to an isolated user space instance, which can be executed within a virtualized environment. Other technologies aside from hardware virtualization can provide isolated user space instances, also referred to as data compute nodes. Data compute nodes may include non-virtualized physical hosts, VMs, containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads. The term "VCI" covers these examples and combinations of different types of data compute nodes, among others.

The program instructions (e.g., machine-readable instructions (MRI)) can include instructions stored on the MRM to implement a particular function (e.g., an action such as confirming that a credentialed user has design credentials associated with a website). The set of MRI can be executable by one or more of the processing resources 448. The memory resources 450 can be coupled to the machine 446 in a wired and/or wireless manner. For example, the memory resources 450 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 450 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 448 can be coupled to the memory resources 450 via a communication path 460. The communication path 460 can be local or remote to the machine 446. Examples of a local communication path 460 can include an electronic bus internal to a machine, where the memory resources 450 are in communication with the processing resources 448 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 460 can be such that the memory resources 450 are remote from the processing resources 448, such as in a network connection between the memory resources 450 and the processing resources 448. That is, the communication path 460 can be a network connection. Examples of such a network connection can include a local area network (LAN), wide area network (WAN), personal area network (PAN), and the Internet, among others.

As shown in FIG. 4, the MRI stored in the memory resources 450 can be segmented into a number of modules 452, 454, 456, 458 that when executed by the processing resources 448 can perform a number of functions. As used herein a module includes a set of instructions included to perform a particular task or action. The number of modules 452, 454, 456, 458 can be sub-modules of other modules. For example, the input module 458 can be a sub-module of the GUI module 456 and/or can be contained within a single module. Furthermore, the number of modules 452, 454, 456, 458 can comprise individual modules separate and distinct from one another. Examples are not limited to the specific modules 452, 454, 456, 458 illustrated in FIG. 4.

One or more of the number of modules 452, 454, 456, 458 can include program instructions and/or a combination of hardware and program instructions that, when executed by a processing resource 448, can function as a corresponding engine as described with respect to FIG. 3. For example, the GUI module 456 can include program instructions and/or a combination of hardware and program instructions that, when executed by a processing resource 448, can function as the option engine 340.

For example, the machine 446 can include a confirmation module 452, which can include instructions to confirm that a credentialed user has design credentials associated with a website. In some examples, confirming that the credentialed user has design credentials can be analogous to authenticating credentialed user to the website, for instance. Such an authentication can be carried out during run-time. In some embodiments, the credentialed user may be prompted to enter authentication information, such as a username, user ID, and/or password, though embodiments herein are not limited to particular information or methods used to authenticate the user. As previously discussed, the credentialed user can be provided with (or otherwise have) design credentials in accordance with the credentialed user's role (e.g., title, job, responsibilities, etc.) with respect to an entity, such as an organization promulgating the website.

The machine 446 can include an interaction module 454, which can include instructions to receive an indication of an interaction of the credentialed user with a display element of the website during run-time. As described herein, the interaction can be an interaction that is different from an interaction with the display element configured to cause execution of an event in a run-time environment (e.g., a hover over the display element versus a click on the display element). Display elements in accordance with one or more embodiments herein include selectable elements, hyperlinks, icons, text entry fields, images, and others. The machine 446 can include a GUI module 456, which can include instructions to display a graphical user interface to the credentialed user during run-time associated with the display element responsive to the interaction and responsive to the confirmation that the credentialed user has design credentials. In some examples, the GUI is a pop-up window displayed adjacent to the display element. The machine 446 can include an input module 458, which can include instructions to receive, via the graphical user interface during run-time, input from the credentialed user that causes a design-time modification to a relationship between the website and a monitoring service in a common run-time design-time environment. The modification of the relationship can include a modification of website usage data sent to the monitoring service. In some examples, the relationship between the website and the monitoring service includes a relationship between a display element of the website and the monitoring service, thus, the modified website usage data can be specific to the display element.

Figure 5:
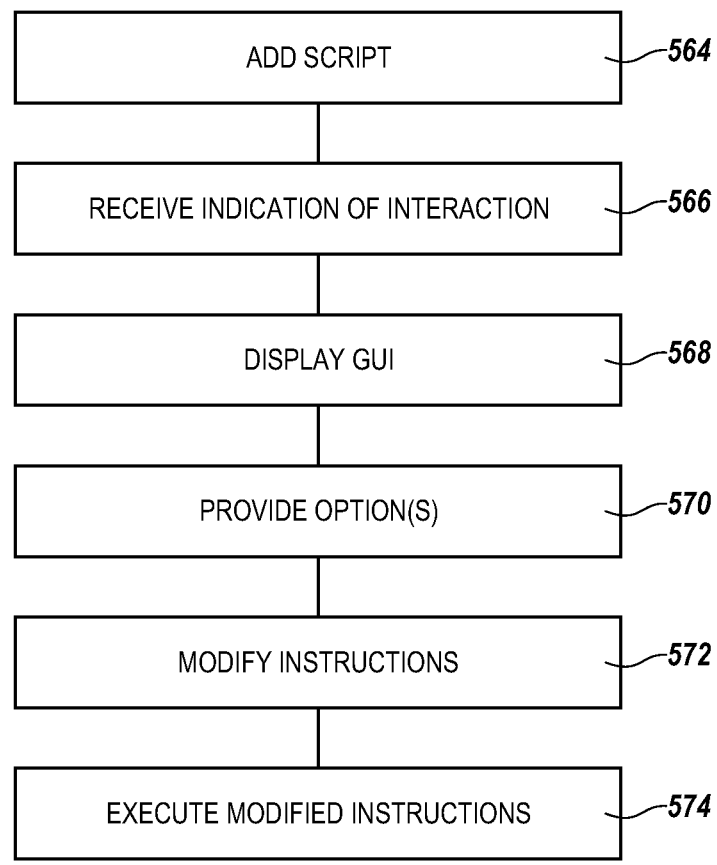
FIG. 5 is a flow chart illustrating a number of methods for a common run-time design-time environment according to a number of embodiments of the present disclosure.

FIG. 5 is a flow chart illustrating a number of methods for a common run-time design-time environment according to a number of embodiments of the present disclosure. At 564, the method can include adding a script to a website responsive to an authentication of a credentialed user during run-time. "Script," as used herein, refers to executable instructions (e.g., instructions executable by a processing resource).

The script added responsive to the authentication of the credentialed user can be referred to as "designer script." In some examples, the designer script can be JavaScript®. The designer script can be added to what may be commonly referred to as a "footer" of the website; that is, the addition of the designer script may not alter the presentation of the website, or the normal functionality of its display elements. The designer script can provide the credentialed user with the capabilities that allow the credentialed user to modify (e.g., customize) the relationship between the website and the monitoring service in a common run-time design-time environment. That is, the website can continue to function "normally" after the addition of the designer script, while the designer script adds enhanced "design-time" abilities to the credentialed user during run-time.

Authentication of a user requesting the website can include prompting the user to enter authentication information responsive to receiving a request for a credentialed role from the user, receiving the authentication information, and determining that the user is credentialed based on the authentication information. That is, a role property value can be requested by the user; if the request is for a role property value of a credentialed role (e.g., a designer role), the user can be requested to enter authentication information (e.g., username, password, etc.). Based on that information, embodiments herein can determine whether the user is credentialed (e.g., is a credentialed user). If the user is credentialed, as described herein, the designer script can be added.

At 566, the method can include receiving an indication of an interaction of the credentialed user with a display element of the website during run-time. The indication of the interaction of the credentialed user with the display element can be included in the monitoring data, as described herein. In some examples, the designer script can receive the indication of the interaction. At 568, the method can include displaying a GUI to the credentialed user during run-time associated with the display element responsive to the interaction according to the script. In some embodiments, the GUI can be a pop-up window displayed adjacent to the display element. The designer script can include instructions executed to display the GUI responsive to the interaction.

At 570, the method can include providing, via the graphical user interface during run-time, at least one option selectable to cause a design-time modification to instructions executed during run-time to provide monitoring data to a monitoring service. In some embodiments, the GUI can include options that are selectable by the credentialed user. Each of the options, upon being selected, can cause, via the designer script, a different design-time modification to the instructions executed to provide monitoring data to the monitoring service. In other words, each of the options can be configured to cause a different modification to a relationship between the website and the monitoring service. At 572, the method can include modifying the instructions according to a selection of the at least one selectable option during run-time. The instructions executed to provide the monitoring data can be modified by the designer script according to the selection. In some embodiments, the modified instructions can be stored in a database which can be later read by a run-time script of the monitoring service.

At 574, the method can include executing the modified instructions to provide monitoring data to the monitoring service for a non-credentialed user who interacts with the display element. The run-time script of the monitoring service, subsequent to the modification, can receive the modified instructions when a user (credentialed or non-credentialed) accesses the website and/or interacts with its display elements. The interaction of the credentialed user with the display element can be different than the interaction of the non-credentialed user (e.g., the interaction of the credentialed user with the display element can be passive, as described herein, and the interaction of the non-credentialed user with the display element can be active, as described herein).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium storing instructions executable by a processing resource to cause a computing system to:
   confirm that a user has design credentials associated with a website;
   receive an indication of a first type of interaction of the user with a display element of the website during run-time, wherein the first type of interaction of the user with the display element comprises a different interaction than a second type of interaction with the display element configured to cause execution of an event during run-time;
   display a graphical user interface to the user during run-time associated with the display element responsive to the first type of interaction and responsive to the confirmation that the user has design credentials; and
   receive, via the graphical user interface during run-time, input from the user that causes a design-time modification to a relationship between the website and a monitoring service in a common run-time design-time environment such that website usage data associated with the display element provided from the website to the monitoring service is modified, wherein the design-time modification to the relationship includes a modification of a definition of an event configured to trigger a tag associated with the display element.

2. The medium of claim 1, wherein the relationship between the website and the monitoring service includes a relationship between the display element of the website and the monitoring service.

3. The medium of claim 1, wherein the modified website usage data is specific to the display element.

4. The medium of claim 1, wherein the first type of interaction of the user comprises the user hovering over the display element via an input device.

5. The medium of claim 1, wherein the display element is one of the group of display elements including a selectable element, a hyperlink, an icon, a text entry field, and an image.

6. The medium of claim 1, wherein the instructions to display the graphical user interface include instructions to display a pop-up window adjacent to the display element.

7. A system, comprising:
   a processor; and
   a memory having instructions stored thereon which, when executed the processor, cause the processor to:
   receive an indication of a first type of interaction of a credentialed user with a display element of a website during run-time, wherein the first type of interaction of the credentialed user with the display element comprises a different interaction than a second type of interaction with the display element configured to cause execution of an event during run-time;
   display a graphical user interface associated with the display element to the user during run-time responsive to the first type of interaction,
      wherein the graphical user interface includes a plurality of selectable options including an option to modify a definition of an event configured to trigger a tag associated with the display element, and
      wherein each option, upon being selected, is configured to cause a different design-time modification to instructions executed to provide website usage data associated with the display element to a monitoring service for analysis;
   receive an indication of a selection of at least one of the plurality of options during run-time; and
   perform at least one design-time modification to the instructions in a common run-time design-time environment responsive to the selection of the at least one of the plurality of options during run-time.

8. The system of claim 7, including instructions to perform the at least one design-time modification to the instructions without receiving additional executable instructions from the user.

9. The system of claim 7, wherein the second type of interaction with the display element is configured to cause execution of the event during run-time for the credentialed user and for a non-credentialed user.

10. The system of claim 7, wherein the plurality of selectable options includes an option of the group of options including:
   an option to associate a tag with the display element;
   an option to modify a tag associated with the display element; and
   an option to remove a tag associated with the display element.

11. The system of claim 7, including instructions to receive the indication without the user leaving run-time;
   display the graphical user interface without the user leaving run-time;
   receive the indication of the selection without the user leaving run-time; and
   perform the at least one design-time modification to the instructions without the user leaving run-time.

12. The system of claim 7, wherein at least one of the plurality of selectable options includes a text field configured to receive alphanumeric inputs defining a variable of the at least one of the plurality of selectable options.

13. The system of claim 7, wherein the plurality of selectable options includes an option of the group of options including:
   an option to add a definition of an event configured to trigger a tag associated with the display element and
   an option to remove a definition of an event configured to trigger a tag associated with the display element.

14. A method for a common run-time design-time environment, comprising:
   adding a script to a website responsive to an authentication of a credentialed user during run-time;
   receiving an indication of a first type of interaction of the credentialed user with a display element of the website during run-time, wherein the first type of interaction of the credentialed user with the display element comprises a different interaction than a second type of interaction with the display element configured to cause execution of an event during run-time;
   displaying a graphical user interface associated with the display element responsive to the first type of interaction, according to the script, during run-time;

providing, via the graphical user interface during run-time, at least one option selectable to cause a design-time modification to instructions executed during run-time to provide website usage data associated with the display element from the website to a monitoring service for analysis;

modifying the instructions according to a selection of the at least one selectable option during run-time, wherein modifying the instructions includes modifying a definition of an event configured to trigger a tag associated with the display element; and executing the modified instructions to provide monitoring data to the monitoring service for a non-credentialed user who interacts, via a second type of interaction, with the display element.

15. The method of claim 14, wherein the first type of interaction of the credentialed user with the display element is passive and wherein the second type of interaction of the non-credentialed user with the display element is active.

16. The method of claim 14, wherein the method includes authenticating the credentialed user, and wherein authenticating includes:

prompting entry of authentication information responsive to receiving a request for a credentialed role;

receiving the authentication information; and verifying the authentication information.

17. The method of claim 14, wherein modifying the instructions comprises modifying the instructions via the script.

18. The method of claim 14, wherein the method includes executing the modified instructions to provide website usage data to the monitoring service for analysis by a run-time script of the monitoring service.

* * * * *